No. 871,518. PATENTED NOV. 19, 1907.
W. NICE, Jr.
WHEEL.
APPLICATION FILED MAY 3, 1907.
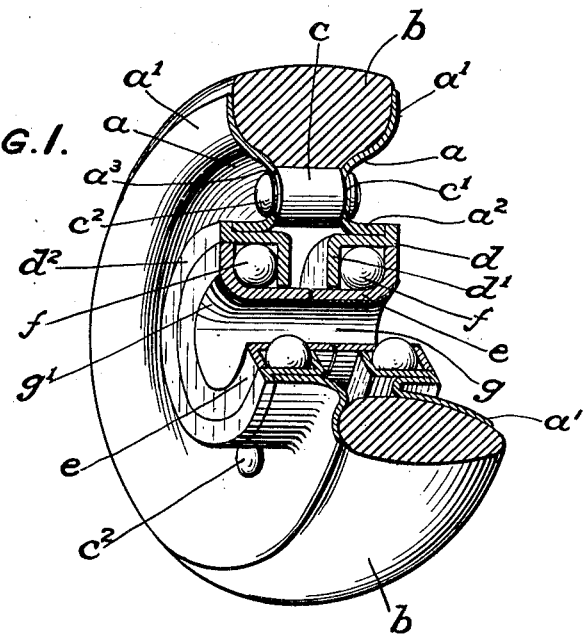
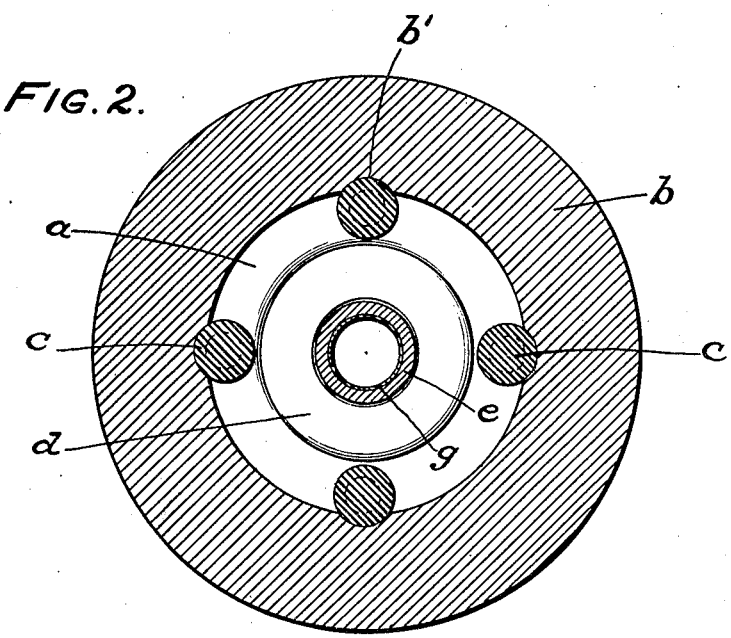
WITNESSES:
INVENTOR
ATTORNEY

UNITED STATES PATENT OFFICE.

WILLIAM NICE, JR., OF OGONTZ, PENNSYLVANIA, ASSIGNOR TO PRESSED STEEL MANUFACTURING COMPANY, OF ATCO, NEW JERSEY, A CORPORATION.

WHEEL.

No. 871,518.     Specification of Letters Patent.     Patented Nov. 19, 1907.

Application filed May 3, 1907. Serial No. 371,576.

*To all whom it may concern:*

Be it known that I, WILLIAM NICE, Jr., a citizen of the United States, residing at Ogontz, in the county of Montgomery and State of Pennsylvania, have invented certain Improvements in Wheels, of which the following is a specification.

This invention is a wheel adapted for use as a roller, particularly for skates but suitable for general purposes.

It consists essentially of pressed steel web faces connected by spacing rivets, providing means for holding a tire, in combination with roller bearings.

The chief object is to provide a simple and inexpensive antifrictional construction having parts readily assembled and firmly held together.

In the accompanying drawing, Figure 1 represents a perspective view of a section of a wheel embodying my invention, and Fig. 2 is a sectional view thereof taken at right angles to the axle of the wheel.

The wheel comprises web faces composed of the reversely curved body portions $a$ terminating in the vertically disposed peripheral flanges $a^1$ and the horizontally disposed interior flanges $a^2$. The flanges $a^1$ engage the tire or tread $b$, and the faces and tire are secured together by the rivets $c$ having the reduced ends $c^1$ in the holes $a^3$ and the engaging heads $c^2$, the bodies of the rivets engaging the notches $b^1$ of the tire to prevent the latter from creeping. The flanges $a^2$ hold the race rings $d$ of substantially Z-shaped cross section, the bodies $d^1$ of the rings lying within the webs or faces and the flanges $d^2$ thereof engaging the edges of the flanges $a^2$.

Thimble rings or cups $e$ of substantially L-shaped cross section are engaged within the races $d$ to hold the balls $f$, the cylindrical portions of the rings extending through the inwardly projecting members of the races and the peripheral flanges of the rings lying within the horizontally disposed members of the races. A bushing $g$ within the thimbles has the expanded ends $g^1$ by which the thimbles are held together.

Having described my invention, I claim:—

A wheel having reverse y curved web faces, rivets for spacing and holding said faces, a tire engaged by said faces, substantially Z-shaped race rings engaged within said webs, thimble rings within said race rings, balls engaged in said race rings by said thimble rings, and a bushing having expanded ends for holding said thimble rings in said race rings.

In testimony whereof, I have hereunto set my name this 1st day of May, 1907, in the presence of the subscribing witnesses.

WM. NICE, JR.

Witnesses:
     ROBERT JAMES EWING,
     JOS. G. DENNY, Jr.